United States Patent [19]
Abercrombie, Jr.

[11] 3,849,151
[45] Nov. 19, 1974

[54] FLOCCULATION OF KAOLIN SLURRIES WITH PHOSPHORIC ACID

[75] Inventor: William F. Abercrombie, Jr., Macon, Ga.

[73] Assignee: J. M. Huber Corporation, Huber, Ga.

[22] Filed: July 2, 1973

[21] Appl. No.: 375,636

[52] U.S. Cl. ............ 106/288 B, 106/72, 106/308 B, 106/309
[51] Int. Cl. ........................ C08h 17/06, C09c 1/42
[58] Field of Search ....... 106/308 B, 309, 72, 288 B

[56] References Cited
UNITED STATES PATENTS

| | | | |
|---|---|---|---|
| 3,291,626 | 12/1966 | Shurling et al. | 106/193 |
| 3,301,691 | 1/1967 | Hemslock et al. | 106/72 |
| 3,318,718 | 5/1967 | Beamesderfer et al. | 106/72 |
| 3,399,960 | 9/1968 | Conley | 106/72 |

Primary Examiner—Delbert E. Gantz
Assistant Examiner—J. V. Howard
Attorney, Agent, or Firm—Pravel & Wilson

[57] ABSTRACT

A process for improving the viscosity and slurry stability of leached kaolin clays, and the improved products thus formed are disclosed. The process involves the addition of phosphoric acid as a clay flocculant to a clay slurry during leaching with known leaching compounds, such as compounds containing an active $(S_2O_4)^{--}$ group, to yield a finished clay product that, upon dispersion, possesses a lowe viscosity and improved slurry stability. Through the practice of the invention, a washing step and/or a second filtration step, sometimes considered necessary in conventional kaolin processing for removal of excess soluble salts to obtain minimum viscosities and adequate slurry stability, is obviated.

11 Claims, 4 Drawing Figures

Fig. 1

- ⊖ ALUM FLOCCULATED (SINGLE FILTERED)
- ○ ALUM FLOCCULATED (DOUBLE FILTERED)
- ⊕ H₃PO₄ FLOCCULATED (SINGLE FILTERED)

FLOCCULATION OF KAOLIN SLURRIES WITH PHOSPHORIC ACID

BACKGROUND OF THE INVENTION

1. Field of the Invention

The present invention relates to kaolin clay products and, more particularly, pertains to a process for improving the viscosity and slurry stability of leached kaoline clays and the improved products thus produced.

2. Description of the Prior Art

Many natural kaolin clays, as mined, are discolored by the presence of iron-stained titaniferous mineral contaminants. It is common practice in the industry to upgrade the color of natural clays by treating the clays with leaching agents to reduce some portion of the color contaminants to soluble salts that can be removed by filtration and/or washing of the leached clays. Generally, the most conventional leaching procedure is to form an aqueous suspension of the clay after coarse contaminants have been removed, acidify the slurry to a pH of from about 3.0 to 4.5 and to add a leaching compound or agent. There are many leaching or reducing agents known in the art, e.g., dithionite leaching compounds and the like. Presently, it is common practice in the industry to employ dithionite leaching compounds containing an active $(S_2O_4)^{--}$ group or a combination of chemicals known to liberate such a group. In addition, in present practice the acidification step is normally accomplished by the addition of flocculating agents such as aluminum sulfate, sulfuric acid, hydrochloric acid, and the like. After leaching, the clay is filtered to remove soluble salts, dispersed or washed, and dried by conventional means.

There are many prior art variations of the abovedescribed somewhat conventional leaching process. For example, British Patent No. 929,539 teaches a process for leaching natural kaolin clays where a trivalent titanium salt is utilized as the leaching or reducing agent. Urfer et al., in U.S. Pat. No. 3,043,707, teach the utilization of orthorhombic phosphorous pentoxide as an acidulating and deflocculating agent in leaching clay slurries. Pantentees disclose a process wherein the orthorhomic phosphorous pentoxide is added to an acidified leached clay slurry, leached with a conventional hydrosulfide leaching agent, to improve leaching and to lower the slurry viscosity.

In addition, British Patent No. 1,041,560, and its Canadian counterpart, Canadian Patent No. 748,473, teach a process for leaching kaolin clay having approximately the same water content as when mined, e.g., clays containing from 20 to 40 percent by weight of water. The references teach a process whereby the low water content clay is first acidified with a non-oxidizing mineral acid, such as ortho-phosphoric acid. The leaching process is carried out in a pug-mill or suitable apparatus for thoroughly mixing materials having a plastic consistency. A solution of a salt of dithionous acid is then added to the acidified clay. The references disclose that the process improves brightness of the clay without requiring the formation of a clay slurry prior to leaching.

As is known in the art, it is preferred that refined leached kaolin clays, especially those to be employed in the coating of paper, have definite and uniform low viscosity properties upon dispersion. It is also preferred that the refined clays, upon dispersion, have a stable viscosity during storage. However, the known prior art processes for leaching kaolin clays mentioned hereinabove primarily have the common disadvantage of producing resulting clays that upon dispersion possess high viscosities and poor slurry stabilities. This is presumed to be due to one or more basic factors including, for instance, the nature of the crude clay from which it originates, the soluble salt content remaining after filtration, excess leach dosage, incomplete reaction of chemical products and the like. Therefore, in order to provide refined, leached kaolin clay products that, upon dispersion, have adequate low viscosities and slurry stability it has become a practice in the industry, when conventional leaching processes are utilized, to sometimes wash the leached clays to remove excess soluble salts not removed by initial filtration. This is usually done by reslurrying or washing the filter cake after leaching and filtering a second time. As should readily be appreciated by those skilled in the art, such techniques, i.e., washing and then filtering a second time, is time consuming, costly and highly undesirable. On the other hand in the practice of the present invention these disadvantages are overcome.

SUMMARY OF THE INVENTION

The present invention provides a highly efficient process for improving the viscosity and slurry stability of leached kaolin clays. The invention is based upon the discovery that the viscosity of a finished clay product can be significantly reduced and the overall rheological properties of dispersed aqueous slurries of such clays greatly improved by the addition of phosphoric acid, as a flocculating agent, to aqueous clay slurries leached with known leading compounds, e.g., a compound containing an active $(S_2O_4)^{--}$ group or a compound capable of liberating such group in the slurry. Generally, the inventive process comprises forming an aqueous kaolin clay slurry, adding a known leaching compound thereto, and then adding phosphoric acid in an amount sufficient to lower the pH of the slurry to within the range of about pH 2.5 to about 4.5 during the leaching step. The resulting leached slurry can then be dewatered, such as by filtration, to remove soluble salts, contaminants and the like to yield a finished clay product which, upon dispersion, possesses a lower viscosity and improved slurry stability upon standing in an aqueous solution, yet the natural brightness of the finished clay product is not substantially reduced, if at all, when compared to finished clays prepared by known prior art leaching processes.

In the practice of the invention, the need for a second filtration step to provide an adequate low viscosity and stability when the clays are leached by known prior art processes, is obviated. Thus, the invention provides a significant savings in labor and overall time required to produce high grade kaolin clays, such as may be required in coating paper and the like.

It is accordingly a general object of this invention to provide a unique process for reducing the viscosity and improving the stability during storage in an aqueous solution of leached kaolin clays.

Another and more particular object of this invention is to provide a highly efficient and economical method for improving the viscosity and slurry stability of a leached kaolin clay, which method eliminates the requirement of a double filtration step.

It is a further object of the instant invention to present an improved process for leaching kaolin clays that produces a resultant finished clay product which, upon dispersion, exhibits viscosities, brightnesses, slurry stabilities and overall rheological properties comparable to or superior to finished clay products leached by conventional processes wherein the processes include the additional steps of washing and refiltering the leached clays to provide desirable low viscosities and stability.

Yet another object of this invention is to provide a method whereby leached clay slurries which now require two consecutive filtration steps, can be filtered only once and still yield an acceptable product having coating properties comparable to conventionally processed clays.

Other objects and advantages of the invention, if not set forth specifically herein, will become readily apparent from the ensuing descriptions of the drawings and the preferred embodiments.

BRIEF DESCRIPTION OF THE DRAWINGS

The manner in which the foregoing and other objects are achieved in accordance with the present invention will be better understood in view of the following detailed description and accompanying drawings, which form a part of this specification and where.

The reference characters of FIG. 1, denoting the recited test samples are similarly employed in FIGS. 2–4.

DESCRIPTION OF THE PREFERRED EMBODIMENT

As mentioned hereinbefore, the present invention pertains to a process wherein phosphoric acid is added to an aqueous clay slurry being leached with known leaching compounds as a clay flocculant to bring about a combined effect with the leaching chemicals to yield a finished clay product exhibiting improved lower viscosity and slurry stability properties. More particularly, crude kaolin clay taken from the mine is first "blunged" in water to form a slip or slurry. A suitable dispersant, such as sodium hexametaphosphate, sodium tripolyphosphate or the like may be added, if desirable, at this point to increase the fluidity of the suspension and enable the maximum quantity of clay to be processed, as is known in the art. The fluid slip may then be passed through "sand boxes" or screens to remove coarse impurities. After "degritting" in this manner, the clay suspension is fractionated in accordance with known techniques and the fine fraction, still in suspension, is in condition for leaching employing known leaching agents.

Turning now to more specific details of the invention, although the percent solids (clay) in the clay-water suspension may vary, particularly advantageous results are obtained when the slurry contains from about 10 to about 35 percent clay solids, by weight. The inventive process is especially applicable to slurries having 25 to 35 percent clay solids, by weight. The leaching chemical and the phosphoric acid flocculant are then incorporated into the kaolin clay slurry in accordance with the instant invention.

While any of the known leaching agents may be used, preferably sodium or zinc dithionite is employed. The particular amount of dithionite added is, of course, dependent upon the severity of discoloration of the kaolin clay being leached and is usually determined empirically. In addition, the quantity is dependent upon the type of dithionite employed. Experience has shown that the addition of from about three to about ten pounds of zinc or sodium dithionite per ton of kaolin clay being treated usually provides adequate leaching, with five to about eight pounds, per ton of clay, of zinc or sodium dithionite normally being optimum for leaching a kaolin clay.

Although the phosphoric acid flocculant may be added substantially simultaneously with the leaching chemical and substantially improved viscosity characteristics will result, in order to accomplish all objectives of the invention, the phosphoric acid should be added after the incorporation of the leaching compound into the slurry as will be more particularly discussed hereafter. The amount of phosphoric acid added to the leach-clay slurry mixture is preferably an amount sufficient to lower the pH of the mixture to within the range of about pH 2.5 to 4.5. The optimum pH range is between about pH 3.5 to about pH 4.5. It has been found that the addition of about ½ to 15 pounds phosphoric acid (on a 100% $H_3PO_4$ basis) per ton of the kaolin clay will usually sufficiently lower the pH of the leach-clay slurry to within the described pH range of about 3.5 to 4.5, the particular amount being dependent upon the particular type of clay and leaching compound being employed and is best determined empirically. Although any desirable concentration of phosphoric acid reagent may be utilized, we prefer to employ phosphoric acid having a concentration on the order from about 70 percent to about 85 percent by weight.

Preferably, the leaching chemical and the phosphoric acid flocculant are added to the slurry while agitating the suspension. A particular rate of agitation or agitation time during and following the addition of ingredients is not critical except insofar as the latter must be sufficient for the leach reaction to reach completion. In general, agitation from 20 to 50 minutes is satisfactory with 25–30 minutes being the preferred time. Any conventional agitation apparatus may be utilized that will produce adequate mixing of added compounds and slurry.

As briefly mentioned hereinabefore, although the improved lower viscosities and slurry stability are obtained when phosphoric acid is added substantially simultaneously with the leaching chemicals to the clay slurries, a loss in maximum brightness is also obtained on some clays, as compared to the maximum brightness of clay slurries leached and flocculated with conventional flocculants, such as aluminum sulfate, sulfuric acid, and the like by conventional processes. However, most unexpectedly, we have found that by the addition of the phosphoric acid after the leaching compound has been added to the clay slurry, but still during the leaching step, the loss of maximum brightness is substantially reduced, if not completely eliminated. This phenomenon is most evident when the leaching chemical, such as zinc or sodium dithionite, is allowed to react with the kaolin clay slurry for about 5 to 15 minutes prior to phosphoric acid addition, with about 10 minutes being optimum. The resultant finished clays have brightness substantially comparable to finished clays flocculated with aluminum sulfate which have been double filtered in accordance with conventional procedures. Additionally, experiments have shown that coating properties of the resultant clays are substantially comparable to double filtered alum flocculated clays in regard to brightness, gloss, printed gloss, opacity, whiteness, ink absorption and the like.

Furthermore, although in the preferred embodiment of the present invention, phosphoric acid is added to a leachclay slurry mixture as a flocculant alone, it will be understood that phosphoric acid can be utilized in combination with known conventional flocculants such as aluminum sulfate, sulfuric acid, hydrochloric acid, etc. For example, phosphoric acid can be combined with aluminum sulfate and employed as the flocculant to produce a finished clay product having improved lower viscosity and slurry stability properties. The particular ratios of phosphoric acid to conventional flocculant employed is primarily dependent upon the properties desired in the finished clay product, so long as the combinations of the flocculants are added in amounts sufficient to lower the pH of the slurry to within the above-described pH range. However, experiments have shown that when the ratio of phosphoric acid to conventional flocculant, e.g. aluminum sulfate, employed decreases, there is a proportional increase in viscosity of the finished clay, upon dispersion. Accordingly, in the practice of this particular embodiment of the invention, wherein phosphoric acid is employed in combination with aluminum sulfate, the phosphoric acid should be added in an amount of at least about twenty-five percent, by weight of the flocculant used. Test results have indicated that about twenty-five percent phosphoric acid, by weight of flocculant, is approximately the minimal amount that can be employed to provide adequate viscosity reduction and slurry stability properties in the finished clays.

As briefly discussed hereinbefore, after phosphoric acid flocculant addition, the leached clay slurry is then dewatered or filtered to remove soluble salts therefrom. Any conventional filtration process and apparatus can be employed. The resulting filter cake may then be dispersed and dried by conventional means or dispersed and stored in slurry form. In this regard, in known leaching processes it has been difficult to achieve a low enough level of soluble salts for maintaining a sufficient viscosity for shipment. This problem is especially disturbing with clays that require excessive amounts of leaching chemicals to obtain suitable coating properties. Thus, in the past it has been necessary to reslurry the filter cake and to refilter to obtain adequate soluble salt removal. Through the practice of this invention, these conventional procedures are obviated.

After filtration, the filter cake is preferably dispersed by the addition of a suitable dispersant to increase the fluidity of the suspension. Any conventional dispersant can be utilized, such as tetrasodium pyrophosphate, sodium hexametaphosphate, sodium tripolyphosphate and the like. The addition of a dispersant is preferably carried out before the drying step, or the drying step may be completely eliminated where the finished clay product is to be shipped and/or stored in slurry form.

As will be further and more fully illustrated by the following examples, the present invention overcomes the disadvantages of the prior art. While particularly advantageous method embodiments have been set forth in the examples, they are intended to illustrate the invention and not to limit it thereto. In the following examples, most of the data showing the comparison of phosphoric acid with other flocculants is stated in pH. Quantities of the compounds are generally not comparable because any specific flocculant will require a different dosage to reach a specific pH, depending upon its acidifying ability.

EXAMPLE I

A degritted, fractionated Central Georgia kaolin fraction of 80 percent less than 2 microns was slurried to 28 percent by weight solids and, with agitation, leached by the addition of 8 pounds $ZnS_2O_4$/ton of clay. The combined mixture was then flocculated by the addition of 6 pounds alum (aluminum sulfate, pH 4.0). Agitation was continued until leaching was completed, taking about 25–30 minutes. The combined slurry was then filtered employing a rotary filter and the filter cake dispersed to minimum viscosity. The resulting low shear, Brookfield viscosity was 207 cps. and the high shear, Hercules viscosity was 14.0 dynes at 1,100 rpm, at 70 percent solids.

The above procedure was repeated except that the clay slurry was leached by the addition of 8 pounds $ZnS_2O_4$ per ton and flocculated by the addition of 3.1 pounds $H_2SO_4$ (pH-4.0) per ton, respectively. Upon dispersion to minimum viscosity, the low shear Brookfield viscosity was 189 cps. and the high shear Hercules viscosity was 12.6 dynes at 1,100 rpm, at 70% solids.

The above procedure was again repeated except that the clay slurry was leached with 8 pounds $ZnS_2O_4$ per ton, and 4.7 pounds $H_3PO_4$ (pH −4.0) per ton was added as the flocculant. After filtration and dispersion of the filter cake to minimum viscosity, the viscosity was lowered to 136 cps. Brookfield viscosity and 5.0 dynes at 1,100 rpm Hercules viscosity, at 70 percent solids.

EXAMPLE II

A degritted, fractionated Central Georgia kaolin fraction of 90 percent less than 2 microns was slurried (28 percent by weight solids), and leached by conventional means with the addition of 6 pounds/ton kaolin of $Na_2S_2O_4$. Six pounds/ton kaolin of alum (pH −4.2) was added to the slurry and the combined mixture agitated for about 25–30 minutes. The slurry was then filtered and the filter cake dispersed by reslurrying to minimum viscosity. At 70 percent solids minimum viscosity the low shear, Brookfield viscosity, was 172 cps. and the high shear, Hercules viscosity, was 12.6 dynes/1,100 rpm.

The process was repeated on another $Na_2S_2O_4$ slurry mixture and with 2.9 pounds/ton clay of $H_2SO_4$ (pH −4.2) being added as the flocculant. After filtration, dispersion and adjustment to 70 percent solids, the refined slurry exhibited minimum viscosities of 170 cps. Brookfield and 13.0 dynes/1,100 rpm Hercules.

The procedure was again repeated employing still another slurry of the same clay leached with the same amount of $Na_2S_2O_4$. However, $H_3PO_4$ was added as the flocculant to the slurry during leaching in an amount sufficient to lower the pH of the slurry to 4.2. After filtration, dispersion and adjustment to 70 percent solids, the final clay slurry viscosity was 106 cps. Brookfield and 8.6 dynes/1,100 rpm Hercules.

EXAMPLE III

A degritted, fractionated East Georgia kaolin fraction of 92–95 percent less than 2 microns was slurried by conventional means to provide a slurry containing about 28 percent by weight clay solids. A portion of the slurry was separated and treated with 6 pounds of $ZnS_2O_4$ per ton of clay and 4.5 pounds of alum/ton clay, the alum being added during leaching with agitation (sample A). A second portion of the clay slurry was treated in the same manner, i.e., six pounds of $ZnS_2O_4$/ton added, except that 2.0 pounds $H_2SO_4$/ton was employed in place of alum. (sample B) A third portion of the same clay slurry was similarly treated with $ZnS_2O_4$ except that 3.9 pounds $H_3PO_4$/ton was added as the flocculant during leaching. (sample C) All samples (A), (B) and (C) were filtered and dispersed to minimum viscosities (70 percent solids) in the same manner except that, prior to dispersion, equal portions of both (A) and (B) were separated, reslurried and refiltered to produce samples (D) and (E). The effectiveness of each treatment procedure upon initial viscosity and slurry stability is shown in the following Table 1.

TABLE 1

VISCOSITY PROPERTIES OF EAST GEORGIA KAOLIN FRACTION
Viscosity, cps. at 70% Solids

| Sample | Flocculant Used | Slurry pH | Dispersed Minimum Brookfield |||
|---|---|---|---|---|---|
| | | | At Make-down | After 3 days Storage At 130°F | After 7 days Storage At 130°F |
| A | Alum | 4.3 | 220 | 1120 | 5400 |
| B | Sulfuric Acid | 4.3 | 232 | 1100 | 12000 |
| C | Phosphoric Acid | 4.3 | 210 | 480 | 2100 |
| D | Alum (2 Filtrations) | 4.7 | 210 | 440 | 1800 |
| E | Sulfuric Acid (2 Filtrations) | 4.4 | 218 | 580 | 4000 |

As is illustrated in Table 1, the utilization of phosphoric acid as a flocculant (C) in the leaching of kaolin provides an improved lower initial viscosity and improved slurry stability as compared to identically processed leached kaolin slurries wherein alum (A) or sulfuric acid (B) is added as the flocculating agent. Moreover, the phosphoric acid flocculated finished clay slurry (C) has an initial viscosity and storage stability substantially comparable to an alum flocculated kaolin slurry (D) that has been reslurried and filtered a second time. Still further, the phosphoric acid flocculated clay slurry has superior low initial viscosity and slurry storage stability as compared to a sulfuric acid flocculated clay slurry (E) that has been double filtered.

EXAMPLE IV

Figure 1:
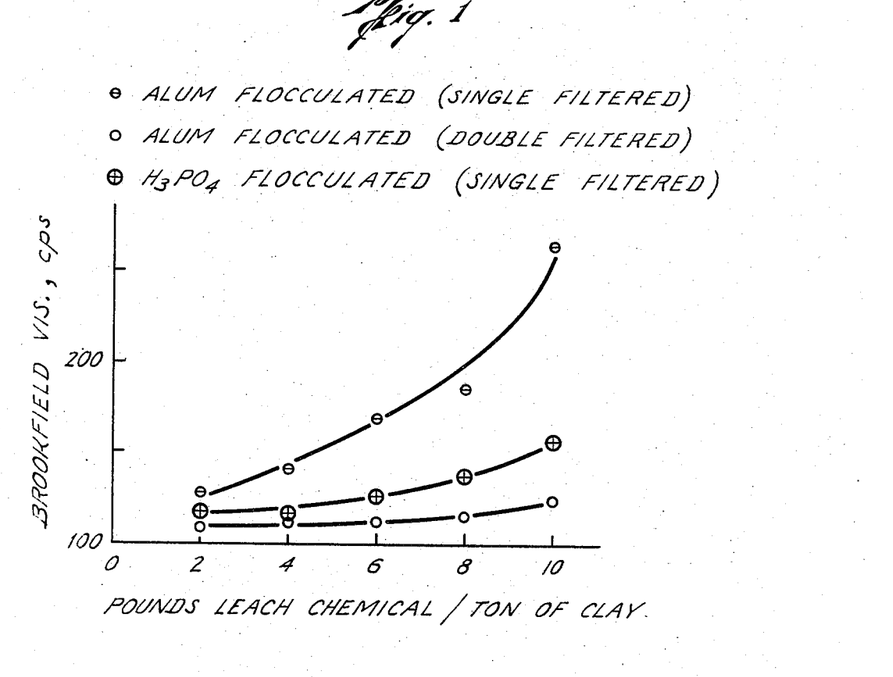
FIGS. 1 and 2 are graphs illustrating the effect of increasing the amount of the leaching compound on the low shear (Brookfield) and high shear (Hercules) viscosities of a Central Georgia kaolin clay when employing phosphoric acid or aluminum sulfate as the flocculating agent at a constant pH.
Figure 2:
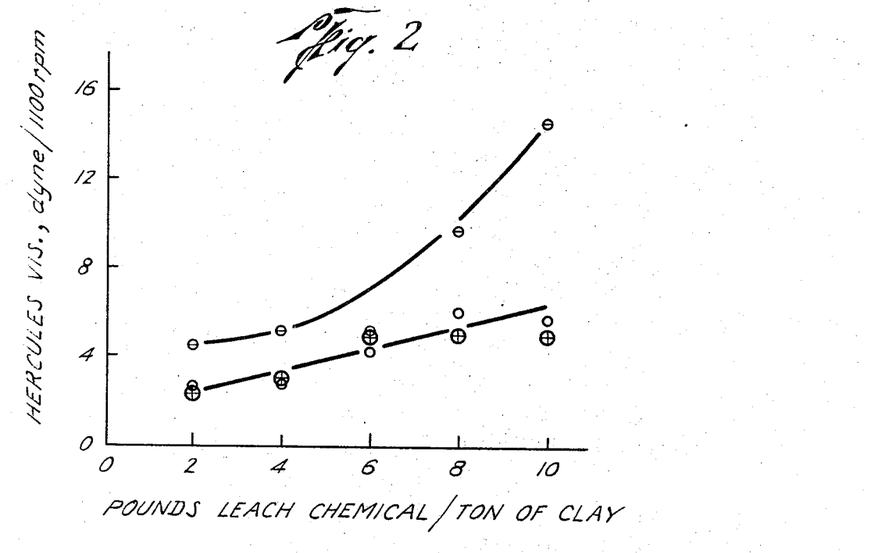

The effect of increasing the leach chemical dosage on a clay slurry (same type as employed and prepared in Example II) viscosity (at 70 percent solids) using phosphoric acid as a flocculant is shown in FIGS. 1 and 2. As shown, these results are compared with leached clay slurries similarly prepared with alum (aluminum sulfate) employed as the flocculant. Also disclosed is the outcome of double filtering the aluminum sulfate flocculated clay. Optimum brightness for this clay was obtained at a leach dosage of 6 pounds $ZnS_2O_4$ per ton of clay. The amount of flocculant employed was held constant at either 6.0 pounds alum/ton or 4.4 pounds $H_3PO_4$/ton of clay, which provided average pH's of about 4.2 and 4.0 respectively.

These results indicate that the use of phosphoric acid with only a single filtration yields essentially the same Hercules viscosities and almost equivalent Brookfield viscosities as the double filtered finished clay products even when the leach chemical dosage is varied. Moreover, as illustrated, the effect of the phosphoric acid flocculation upon viscosity becomes more pronounced as the leach dosage is increased beyond optimum.

EXAMPLE V

Several test samples of leached clay (Central Georgia kaolin) slurries were prepared generally in accordance with the procedure of Example II employing $ZnS_2O_4$ as the leach chemical and $H_3PO_4$ and aluminum as respective flocculants. In each test sample the $ZnS_2O_4$ utilized was held constant at 8 pounds $ZnS_2O_4$ per ton of clay solids. However, the amount of flocculant ($H_3PO_4$ or aluminum sulfate) added to each sample was varied which resulted in slurries with differing pH's. After leaching, with agitation, for about 25–35 minutes, each sample was filtered. The filter cake of half the alum flocculated samples were then reslurried with water and filtered a second time. All samples were finally dispersed and adjusted to 70 percent solids slurries. The low and high shear viscosities of each sample were then tested per Example I and plotted versus the pH determined by $H_3PO_4$ and alum flocculant addition. The results have been illustrated in FIGS. 3 and 4.

Figure 3:
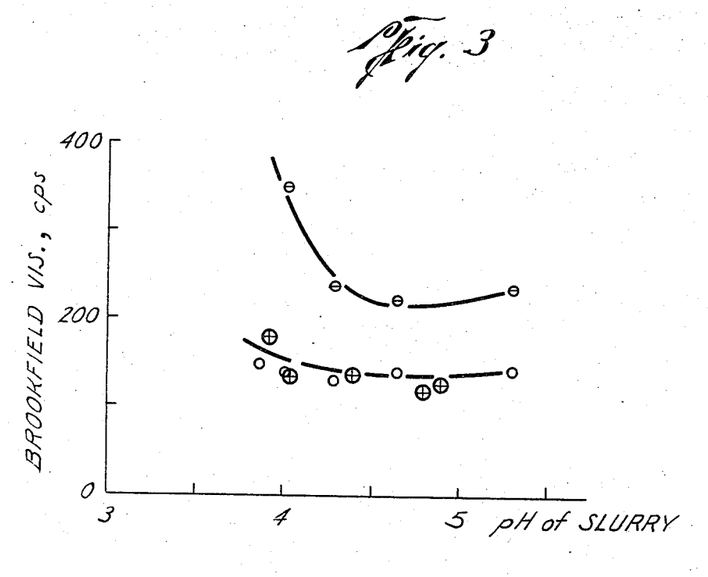
FIGS. 3 and 4 are graphs illustrating the effect on the low and high shear viscosities of a Central Georgia kaolin clay when the pH, determined by the amount of flocculant employed, of the clay slurry is varied while the amount of the leaching compound is held at a constant level. The use of phosphoric acid and aluminum sulfate as the flocculant are compared similarly as in FIGS. 1 and 2.
Figure 4:
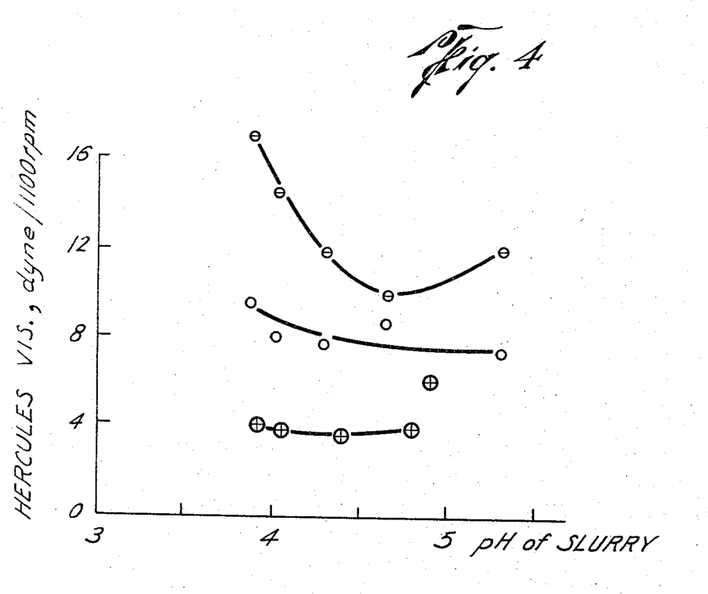

As shown in FIGS. 3 and 4, the use of phosphoric acid as a flocculant with only a single filtration in a wide range of amounts produces finished clay slurries having greatly superior low and high shear viscosities than single filtered finished slurries flocculated with comparable amounts of alum. Moreover, the $H_3PO_4$ flocculated samples have low and high shear viscosities substantially equal to and superior, respectively, to double filtered alum flocculated samples.

EXAMPLE VI

In a series of tests, a Central Georgia clay slurry (90 percent less than 2 microns) of 28 percent solids, prepared per Example II, was utilized. Tests were conducted employing the following three conditions:
   A. Single filtered, flocculated with alum
   B. Double filtered, flocculated with alum
   C. Single filtered, flocculated with phosphoric acid Leaching of each test sample was performed with the addition of 7.5 pounds $ZnS_2O_4$/ton and then sufficient flocculant was added to obtain a pH of 4.3 per Example II. All test samples were then filtered, dispersed and minimum viscosities adjusted to 70 percent solids in the same manner except that test sample "B" included an additional filtration step. The samples were then analyzed for minimum viscosity and slurry stability at 130°F. The results of the tests are shown in Table 2.

TABLE 2

| Test No. | VISCOSITY PROPERTIES OF HYDRAFINE* | | |
|---|---|---|---|
|  | A | B | C |
| Flocculant Used | Alum | Alum | $H_3PO_4$ |
| No. of Filtrations | One | Two | One |
| Minimum Viscosity at 70% Solids | | | |
| Brookfield, cps | 193 | 128 | 138 |
| Hercules, dynes/1100 rpm | 10.0 | 4.3 | 4.0 |
| Slurry Stability at 130°F — Brookfield Viscosity, cps | | | |
| After 3 Days | 181 | 145 | 149 |
| After 7 Days | 195 | 158 | 158 |

*A Central Georgia kaolin fraction of 90% less than 2 microns sold under the trademark "hydrafine" by the J. M. Huber Corporation.

Table 2 illustrates minimum viscosity and slurry stability properties of a single filtered, phosphoric acid flocculated clay are greatly improved as compared to said properties of single filtered, alum flocculated clay and substantially equivalent to the double filtered, alum flocculated clay.

EXAMPLE VII

In a series of tests, an East Georgia kaolin slurry (92–95 percent less than 2 microns) of 25 percent solids was prepared in the same manner as set forth in Example III. Tests were made on the clay slurry using the following three conditions:

A. Single filtered — flocculated with alum
B. Double filtered — flocculated with alum
C. Single filtered — flocculated with phosphoric acid Three test samples of the clay slurry were leached by the addition of 6.3 pounds $ZnS_2O_4$/ton followed by flocculant addition in amounts sufficient to lower the pH of the slurries to about 4.2. These samples were then filtered, dispersed and analyzed for minimum viscosity and slurry stability per Example VI. Results of the tests are shown in the following Table 3.

TABLE 3

| Test No. | VISCOSITY PROPERTIES OF HYDRAGLOSS* | | |
|---|---|---|---|
|  | A | B | C |
| Flocculant Used | Alum | Alum | $H_3PO_4$ |
| No. of Filtrations | One | Two | One |
| Minimum Viscosity at 70.5% Solids | | | |
| Brookfield, cps | 252 | 211 | 230 |
| Hercules, dynes/1100 rpm | 1.9 | 1.8 | 1.8 |
| Slurry Stability at 130°F — Brookfield Viscosity, cps | | | |
| After 3 Days | 930 | 311 | 383 |
| After 7 days | 4240 | 1030 | 1880 |

*An East Georgia kaolin fraction of 92-95% less than 2 microns sold under the trademark "Hydragloss" by the J. M. Huber Corporation.

Table 3 illustrates the physical properties of the clays. The single filtered, phosphoric acid flocculated clay is essentially equivalent to the double filtered alum flocculated control in both minimum viscosity and slurry stability. On the other hand, it is superior to single filtered, alum flocculated clay.

EXAMPLE VIII

To illustrate the improvement in viscosity and slurry stability obtained by the use of phosphoric acid as a flocculant even in blends with conventional flocculants, a series of tests were made by blending alum and $H_3PO_4$ in varying proportions and utilizing the blends as the flocculating agent. A slurry of Central Georgia kaolin fraction of 80 percent less than 2 microns having 30 percent by weight solids was prepared in accordance with the process of Example I. Test samples of the slurry were leached by the addition of 6 pounds $ZnS_2O_4$/ton. During leaching, a blend of alum and phosphoric acid, in varying proportions, was added to each test sample in an amount sufficient to adjust the pH of the slurry mixture to about pH 4.4. The samples were filtered, dispersed, and analyzed for viscosity and slurry stability in a like manner. The results are shown in Table 4.

TABLE 4

| Test No. | PHYSICAL PROPERTIES OF KAOLIN CLAY FLOCCULATED WITH BLENDS OF ALUM AND $H_3PO_4$ | | | | |
|---|---|---|---|---|---|
|  | 1 | 2 | 3 | 4 | 5 |
| % of Flocculant Used (By Weight) | | | | | |
| Alum | 100 | 75 | 50 | 25 | — |
| $H_3PO_4$ | — | 25 | 50 | 75 | 100 |
| Minimum Viscosity at 70% Solids | | | | | |
| Brookfield, cps | 176 | 169 | 132 | 112 | 112 |
| Hercules, dynes/1100 rpm | 14.0 | 8.8 | 5.6 | 5.5 | 5.0 |
| Slurry Stability at 130°F — Brookfield Viscosity, cps | | | | | |
| After 3 Days | 280 | 207 | 195 | 188 | 136 |
| After 7 Days | 462 | 310 | 276 | 188 | 168 |

The above results indicate that the viscosity and slurry stability of the clay is proportionately improved with the use of increasing amounts of phosphoric acid as the flocculant.

EXAMPLE IX

The use of phosphoric acid as a flocculant may result in a slightly lower brightness of the finished product if not properly added to the clay slurry in a prescribed method. In accordance with the present invention, phosphoric acid is added after the leaching compound is added to the clay slurry to allow the leaching compound to react with the clay slurry. Table 5 illustrates the importance of this embodiment and shows that for maximum brightness the $H_3PO_4$ should be added from about 5 to 15 minutes (preferably about 10) after the addition of the leach chemical. The results of Table 5 were obtained by treating the same type clay slurry prepared in Example II. Leaching was accomplished by the addition of 6 pounds $ZnS_2O_4$/ton to said slurry.

TABLE 5

SEQUENCE OF LEACH AND FLOCCULANT ADDITION TO KAOLIN CLAY

| Sample | Flocculant Used | Time Allowed for Leach to React Prior to Flocculant Addition, Mins. | Brightness % | Minimum Brookfield Viscosity at 70% Solids, cps. |
|---|---|---|---|---|
| 1(Control) | Alum | None (Added Together) | 89.3 | 162 |
| 2(Control) | Alum | 10 | 89.2 | 167 |
| 3 | $H_3PO_4$ | None (Added Together) | 88.8 | 133 |
| 4 | $H_3PO_4$ | 5 | 89.0 | 130 |
| 5 | $H_3PO_4$ | 10 | 89.3 | 125 |
| 6 | $H_3PO_4$ | 15 | 89.2 | 128 |
| 7 | $H_3PO_4$ | Leach added 10 mins. after $H_3PO_4$ | 87.8 | 128 |

EXAMPLE X

To determine the physical properties of a Central Georgia coating clay leached and flocculated to a pH of about 2 to 3 by a $H_3PO_4$ the following experiment was conducted. A slurry of a Central Georgia kaolin fraction of 80 percent less than 2 microns having 30.66 percent solids, by weight, was prepared in accordance with the process of Example I. Individual samples of the slurry were leached by the addition of 6 pounds $ZnS_2O_4$/ton of clay and varying amounts of alum or $H_3PO_4$ to obtain the desired pH. Each sample was single-filtered, dispersed to minimum viscosity and spray dried — prior to physical testing. The results are set forth in Table 6.

TABLE 6

EFFECT OF LEACHING WITH PHOSPHORIC ACID AT LOW pH'S

| Test No. | 1 | 2 | 3 | 4 | 5 | 6 |
|---|---|---|---|---|---|---|
| Flocculant Used | Alum | Alum | $H_3PO_4$ | $H_3PO_4$ | $H_3PO_4$ | $H_3PO_4$ |
| pH Prior to Filtration | 4.5 | 4.0 | 4.5 | 4.0 | 3.0 | 2.0 |
| Amount of Flocculant No./ton clay | 5.0 | 11.0 | 2.2 | 3.7 | 9.4 | 85.2 |
| Physical Properties Brightness, % | 86.6 | 86.8 | 86.0 | 86.0 | 86.3 | 85.5 |
| Min. Viscosity at 70% Solids: Brookfield, cps | 220 | 258 | 138 | 148 | 148 | 1200* |
| Hercules, dynes/rpm | 18+/730 | 18+/730 | 18+/1075 | 18+/1075 | 18+/915 | — |

*At solids of only 64.4

The above results illustrate that $H_3PO_4$ flocculated clays produce a substantial reduction in viscosity as compared to alum flocculated clays at the same pH. In addition, it can be seen that reduction in viscosity is obtained by employing $H_3PO_4$ up to an amount that will provide a pH somewhere between pH 2 and 3. At pH 2, the viscosity of the clay is tremendously high.

Obviously many modifications and variations of the invention as hereinbefore set forth may be made without departing from the spirit and scope thereof. And, therefore, only such limitations should be imposed as are indicated in the claims.

I claim:

1. In the method for producing high grade kaolin clay, products which comprises leaching a dispersed kaolin clay water slurry with about 3 to about 10 pounds, per ton of clay, of a leaching agent capable of reducing the insoluble salts present in said slurry as impurities to their soluble form, flocculating said slurry with a flocculating agent, and dewatering the resultant slurry mixture to remove said soluble salts, the improvement comprising:

adding phosphoric acid as a flocculating agent to said slurry during the leaching step, said phosphoric acid being added in an amount sufficient to reduce the pH of the slurry to between about 2.5 to about 4.5, to thereby obtain a finished clay product that upon dispersion, possesses improved low viscosity and slurry stability characteristics.

2. A method for improving the viscosity and slurry stability of kaolin clays leached to remove color impurities therein, said method comprising:

a. forming an aqueous slurry of a finely divided kaolin clay;

b. contacting said aqueous slurry with from about 3 to about 10 pounds, per ton of clay, of a leaching agent capable of reducing insoluble salts present in said slurry to a soluble form, said leaching agent comprising a compound containing an active $(S_2O_4)^{--}$ group or a compound capable of liberating such group in said slurry;

c. adding phosphoric acid as a flocculant to the slurry-leaching agent mixture, said phosphoric acid being added in an amount sufficient to lower the pH of said mixture to between about pH 2.5 to about pH 4.5; and d. dewatering the resultant mixture to thereby obtain a finished clay product that, upon dispersion, possesses improved low viscosity and slurry stability during storage.

3. The method in accordance with claim 2, wherein said leaching agent is a compound selected from the group consisting of sodium dithionite and zinc dithionite.

4. The method in accordance with claim 2, wherein said phosphoric acid is added in an amount sufficient to lower the pH of the slurry leaching agent mixture to between about 3.5 to about 4.5.

5. The method in accordance with claim 2, wherein said phosphoric acid is added at least about 5 minutes after the beginning of the leaching step to thereby obtain maximum brightness of the finished clay product as well as said improved viscosity and slurry stability.

6. A method in accordance with claim 2, wherein said phosphoric acid is added in an amount of from about ½ to about 15 pounds phosphoric acid per ton of the kaolin clay.

7. The method in accordance with claim 2, wherein said slurry contains from about 10 to 35 percent clay solids, by weight.

8. The method in accordance with claim 2, wherein said phosphoric acid is employed as said flocculant in combination with a flocculant selected from the group consisting of aluminum sulfate, sulfuric acid, or hydrochloric acid.

9. The method in accordance with claim 8, wherein said phosphoric acid is added during the leaching step in combination with aluminum sulfate.

10. A method in accordance with claim 9, wherein at least about twenty-five percent by weight of said phosphoric acid-aluminum sulfate mixture is phosphoric acid.

11. A high grade kaolin clay product which, upon dispersion, possesses improved low viscosity and slurry stability during storage in an aqueous solution, said kaolin clay product being prepared by the method comprising the steps of:

a. forming an aqueous slurry of a finely divided kaolin clay;

b. contacting said clay water slurry with from about 3 to about 10 pounds, per ton of clay, of a leaching agent capable of reducing the insoluble salts present in said slurry to their soluble form, said leaching agent being selected from the group consisting of sodium dithionite and zinc dithionite;

c. adding phosphoric acid as a flocculant to the slurry during the leaching step in an amount sufficient to lower the pH thereof to between about pH 2.5 to about pH 4.5, said acid being added after the leaching step begins; and d. dewatering the resultant mixture to thereby obtain a finished clay product that, upon dispersion, possesses low viscosity and improved slurry stability.

* * * * *

PO-1050
(5/69)

UNITED STATES PATENT OFFICE
CERTIFICATE OF CORRECTION

Patent No. 3,849,151                Dated November 19, 1974

Inventor(s) William F. Abercrombie, Jr.

It is certified that error appears in the above-identified patent and that said Letters Patent are hereby corrected as shown below:

On the cover page of the Patent, in the right hand column, in the Abstract, line 8, cancel "lowe" and substitute -- lower --.

In column 4, line 58, cancel "hereinabefore" and substitute -- hereinbefore --.

In column 5, line 20, cancel "leachclay slurry mixture" and substitute -- leach-clay slurry mixture --.

In column 7, Table 1, cancel "Viscosity, cps. at 70% Solids" on the left side of the table and substitute -- Viscosity, cps. at 70% Solids -- on the right hand side of the table immediately below Dispersed Minimum Brookfield.

In column 11, Table 6, under Amount of Flocculant, cancel "No./ton clay" and substitute -- Lbs./ton clay --.

Signed and sealed this 11th day of March 1975.

(SEAL)
Attest:

RUTH C. MASON
Attesting Officer

C. MARSHALL DANN
Commissioner of Patents
and Trademarks